United States Patent Office 3,334,852
Patented Aug. 8, 1967

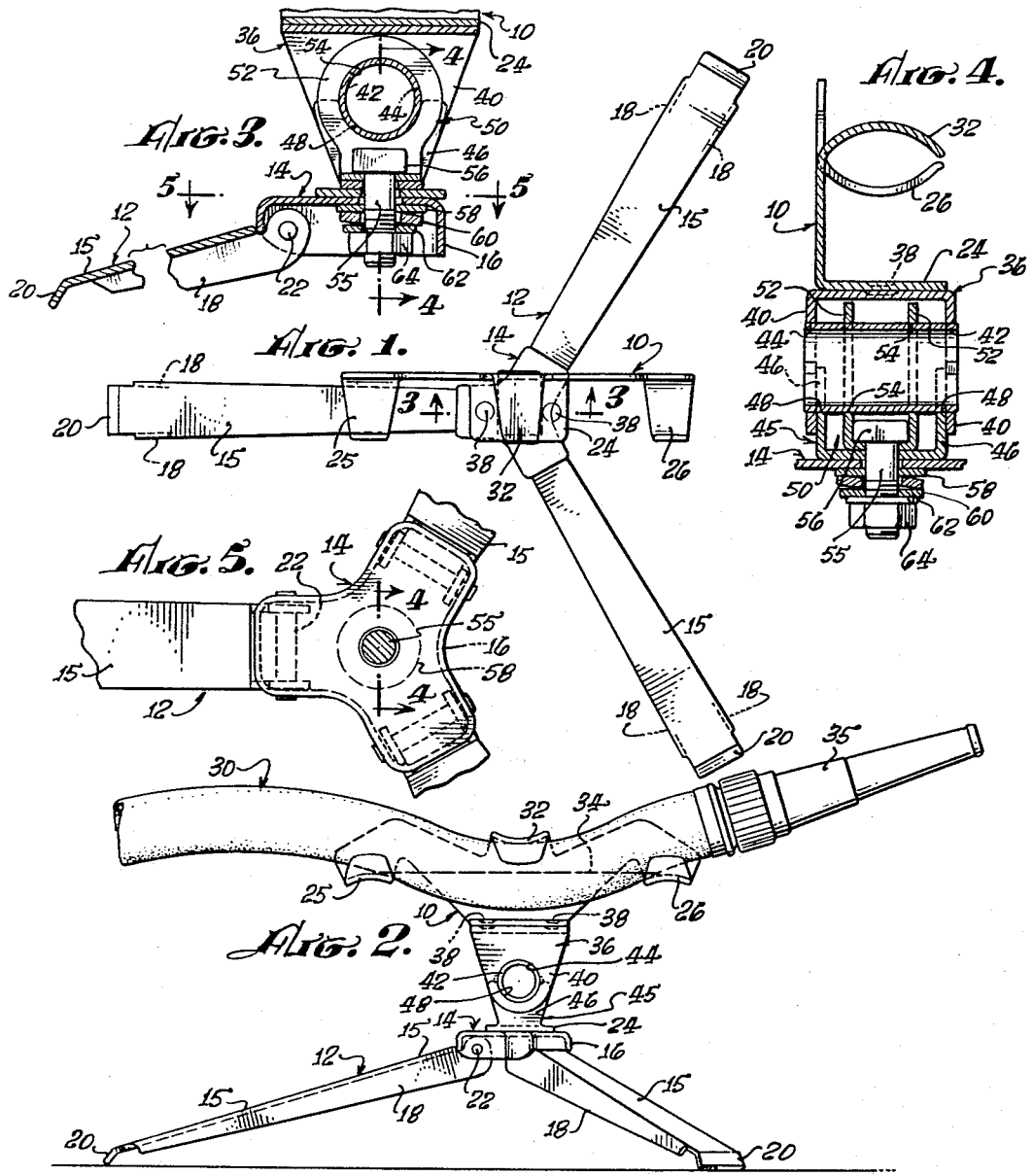

3,334,852
DEVICE TO HOLD HOSE FOR SPRINKLING
Kunio A. Sumida, 1114 N. Kenter Ave. 90049, and William T. Wills, Jr., 3911 Olympiad Drive 90043, both of Los Angeles, Calif.
Filed July 16, 1965, Ser. No. 472,529
14 Claims. (Cl. 248—83)

This invention relates to a holder for an end of a garden hose that is equipped with a spray nozzle, the purpose of the holder being to keep the nozzle pointed in a desired direction to sprinkle a selected ground area.

Various expedients are commonly improvised to hold a hose in position to water a selected garden or lawn area and thus avoid the tedious necessity of manually holding the hose throughout an extended period of time. For example, the end of the hose or the nozzle thereon may be propped up on a convenient object and the adjacent portion of the hose may be weighted down with another object to immobilize the hose. Such makeshifts are unsatisfactory and unreliable.

It is also possible to omit the conventional nozzle on the end of a garden hose and to substitute a commercially available nozzle fitting that has an integral stake or pointed rod that may be driven into the ground to hold the nozzle in a desired position. One disadvantage of such a practice is that it necessitates substituting a non-adjustable nozzle for a nozzle that can be adjusted through a range from coarse to fine spray. A second disadvantage is that driving the stake into the ground may be difficult if the earth is dry. Still another disadvantage is that adjustment of the tilt of the nozzle requires withdrawing the stake and again driving the stake into the ground. A further disadvantage is that often a hose tends to squirm and turn in response to the water flow and a stake in the form of a pointed rod acts as a simple pivot that facilitates rather than hinders turning of the nozzle to undesired directions.

The present invention eliminates all of these disadvantgaes by providing a suitable support structure with an upright yoke mounted thereon, which yoke has no moving parts and yet is capable of releasably engaging an end portion of a garden hose in a highly effective manner. In this regard the invention is characterized by a yoke design that takes advantage of the resilient resistance to flexure that is inherent in any garden hose.

In the preferred practice of the invention, the yoke is a sheet metal stamping with three spaced projections in the form of smooth tongues that all extend in the same lateral direction. Two of the spaced tongues have curved upper surfaces to engage the underside of the hose and the third tongue which is intermediate the other two tongues has a curved under surface to engage the upperside of the other hose. The third tongue is above the level of the other two tongues by a distance somewhat less than the outside diameter of the hose with the result that the three tongues cooperate to bow the hose downward to create effective engagement with the hose.

It is a simple matter to bow a hose assembly for the purpose of engaging the hose with the three tongues and to bow the hose subsequently for the purpose of releasing the hose from the yoke. Once the hose is engaged by the three tongues, its own inherent resilience maintains the engagement effectively and in addition the bowing of the hose desirably cants the hose nozzle upward. Since the device is relatively small and light in weight, it may be readily turned to one position for convenient manipulation by a righthanded person and may be turned 180° to a second position for convenient manipulation by a lefthanded person. Preferably the yoke is symmertical with respect to the relative positions of the three tongues and therefore may be employed with equal facility to hold the hose with the nozzle of the hose pointing in either of two directions.

The degree to which the bowing of the hose by the three tongues inclines the nozzle upward is not critical because a feature of the preferred embodiment of the invention is that the yoke is adjustable in tilt relative to the base structure on which it is mounted. In addition the yoke is pivotally mounted on the base structure for rotation about an upright axis to permit the hose to be turned to different directions without turning the base structure of the device.

The preferred embodiment of the invention is made of corrosive-resistant metal for ruggedness and durability. In this regard a feature of the preferred embodiment is that the device comprises an assembly of sheet metal parts of configurations suitable for economical mass production. Further economy is achieved by a design wherein the upright yoke is assembled to the base structure by a single multiple-purpose bolt. The basic purpose of the bolt is to hold the parts together; a second function is to serve as a pivot for rotation of the yoke relative to the base structure about a vertical axis; a third function is to cooperate with annular spring means in the form of a resilient lock washer to provide a desired degree of frictional resistance to tilt adjustment of the yoke about a horizontal axis; and a fourth function is to cooperate with the same resilient lock washer to provide a desired degree of frictional resistance to rotational adjustment of the yoke about the vertical axis.

In the preferred embodiment of the invention, the base structure is in the form of a low tripod with hinged legs, the legs spreading wide apart to provide a broad base for stability. The breadth of the base and the fact that the legs have terminal flanges to engage the ground or grass gives the device ample resistance to any turning force exerted by the hose. The hinged legs make the device collapsible for compact storage and the device may be readily hung on a nail on a wall when not in use.

The features and advantages of the invention may be understood from the following detailed description and the accompanying drawing.

In the drawing, which is to be regarded as merely illustrative:

FIG. 1 is a plan view of the presently preferred embodiment of the invention;

FIG. 2 is a side elevation of the device in use to hold the end of a hose;

FIG. 3 is a fragmentary sectional view on enlarged scale taken along the line 3—3 of FIG. 1;

FIG. 4 is a fragmentary sectional view taken along the lines 4—4 of FIG. 3 and FIG. 5, the sectional view showing the arrangement for mounting the yoke on the base structure for adjustment about two axes;

FIG. 5 is a fragmentary horizontal section taken along the line 5—5 of FIG. 3 and showing the base structure in plan; and FIG. 6 is an exploded view of the parts shown in FIG. 4 for pivotally mounting the yoke on the base structure.

The presently preferred embodiment of the invention, illustrated by the drawing, comprises an upright yoke, generally designated 10, mounted on a suitable base structure in the form of a tripod that is generally designated by numeral 12. The tripod 12 comprises what may be termed a base member 14 with three legs 15 hingedly connected thereto. In the construction shown, the base member is a sheet metal stamping with a downwardly extending flange 16, the sheet metal having three lobes for the three legs.

Each of the three legs 15 is also a sheet metal stamping that is stiffened by side flanges 18 and is formed with an end flange 20 which tends to penetrate loose soil and which will readily engage grass when the device is used on a lawn. It is to be noted that the tripod is relatively low and that the three legs 15 spread far apart to provide a stable base capable of withstanding forces that may tend to tilt the device or tend to turn the device about its vertical axis. Each of the legs is connected to a corresponding lobe of the base member 14 by a staked pivot pin 22 and it may be seen in FIGS. 2 and 3 that each leg at its extended position bears upward against the flange 16 of the base member.

The yoke 10 is a sheet metal stamping and is formed with a bottom flange 24 by means of which it is attached to the tripod 12. The yoke 10 has three projections in the form of three tongues all of which project in the same radial direction. Two of the tongues 25 and 26 have upper surfaces to engage the underside of a garden hose 30 and are curved to cradle the hose as shown. The third tongue 32 has an under surface to engage the upper side of the hose and is also curved as shown to conform to the curved cross-sectional configuration of the hose.

The upper surfaces of the two tongues 25 and 26 determine a dotted line 34 in FIG. 2 and the third tongue 32 is above the level of this dotted line. The under surface of the third tongue 32 which contacts the upper side of the hose 30 is spaced above the dotted line 34 by a distance that is less than the outside diameter of the hose and because of this fact the three tongues cooperate to bow the hose downward as shown in FIG. 2. Thus the invention uses the flexural resilience of the hose itself to create frictional grip on the hose. In consequence of the downward bowing of the hose, the nozzle 35 on the end of the hose is inclined slightly upwardly. When water is projected from the inclined nozzle, the resultant reaction force has a downward component that tends to stabilize the device and to increase the effectiveness of the engagement of the tripod legs with the ground.

The means for mounting the yoke 10 on the tripod 12 is preferably in the form of an assembly comprising the following members: a bracket 36 in the form of a sheet metal stamping to which the bottom flange 24 of the yoke 10 is spot welded as indicated at 38 in FIG. 4, the bracket having a pair of downwardly extending ears 40; an elongated pivot member 42 in the form of a tube, the tube extending through corresponding apertures 44 (FIG. 6) in the ears 40 of the bracket 36 and being fixedly staked to the bracket; a support member 45 in the form of a sheet metal stamping having a spaced pair of upwardly extending flanges 46 which have rounded recesses 48 (FIG. 6) to cradle the pivot member 42; a stirrup member 50 in the form of a sheet metal stamping having two upwardly extending flanges 52 with aligned apertures 54 therein (FIG. 6) to embrace the pivot member 42; a bolt 55 having a square head 56 to nest into the stirrup member 50 as shown in FIG. 4, the bolt extending downward through aligned apertures in the stirrup member 50, the support member 45, and the base member 14; a plain washer 58 on the bolt 55 in abutment against the underside of the base member 14; annular spring means in the form of a resilient split lock washer 60 bearing against the underside of the washer 58; a second plain washer 62 bearing against the underside of the lock washer; and, finally a nut 64 on the lower end of the bolt to hold the lock washer 60 under axial compression.

When the nut 64 is suitably tightened to compress the lock washer 60, the lock washer exerts constant force downward on the stirrup member 50 to press the pivot member 42 against the support member 45 thereby to provide a desired degree of frictional resistance to rotation of the yoke 10 about the axis of the pivot member 42 to which the yoke is fixedly attached. It is apparent that the bolt 55 serves multiple functions in that it not only holds the assembly together but also serves as a pivot for rotation of the yoke about a vertical axis relative to the tripod and in addition cooperates with the lock washer 60 to provide a desirable degree of frictional resistance to tilt adjustment of the yoke. In addition the bolt cooperates with the lock washer 60 to press the support member 45 against the base member 14 to provide a desirable degree of resistance to rotation of the yoke about the axis of the bolt whereby the yoke tends to maintain any orientation at which it may be adjusted.

The manner in which the device serves its purpose may be readily understood from the foregoing description. It is apparent that it is a simple matter to bow a hose for the purpose of engaging the hose with the yoke or for the purpose of disengaging the hose from the yoke. It is also apparent that the yoke will engage hoses of different diameters. A further feature is that the bowing of the hose by the three tongues of the yoke resists torque forces that may tend to twist the hose about its axis.

The device may be turned readily either to a position for convenient manipulation by a righthanded person or to a position for convenient manipulation by a lefthanded person. It is also to be noted that the yoke is of symmetrical configuration as may be seen in FIG. 2 whereby the hose may be engaged by the yoke with the nozzle of the hose pointing in either of two opposite directions.

Once the hose is engaged by the yoke the yoke may be manually tilted to incline the nozzle 35 at any desired angle. The legs 15 of the tripod spread sufficiently and make efficiently effective engagement with the soil or lawn to keep the device from turning in response to normal forces that may be transmitted to the device by the hose 30. The frictional resistance to rotation of the yoke relative to the tripod about the axis of the bolt 55 is also of sufficient magnitude to resist such normal forces and yet the yoke may be readily manually rotated about the axis of the bolt for adjustment in the direction of which the hose points or for change in the direction.

By virtue of the hinged mounting of the three legs 15, the tripod 12 is readily collapsed to make the device compact for storage. It is also to be noted that the yoke is shaped to hook over a nail to permit the collapsed device to be hung on a wall.

Our description in specific detail of the selected embodiment of the invention will suggest various changes, substitutions and other departures from our disclosure within the spirit and scope of the appended claims.

We claim:

1. In a device of the character described to engage and hold a portion of a hose, the combination of:
    a yoke to engage the portion of the hose; and
    a base structure supporting the yoke,
    said yoke having two spaced projections extending therefrom in the same lateral direction with surfaces to engage the one side of said portion of the hose,
    said yoke having a third projection extending in the same lateral direction with a surface to engage the other side of said portion of the hose, said third projection being between the first two projections with said surface of the third projection spaced from a line defined by the said surfaces of said two projections, said surface of the third projection being spaced from said line by less than the outside diameter of the hose to cause said portion of the hose to bow with the hose resiliently opposing the bowing.

2. A combination as set forth in claim 1 in which said yoke is symmetrical for use with the hose pointing in either of two opposite directions.

3. A combination as set forth in claim 1 in which the yoke is pivotally mounted on the base structure for rotary adjustment relative thereto.

4. In a device of the character described to hold an end portion of a garden hose in position for watering a selected ground area, the combination of:
    a yoke to engage the end portion of the hose; and
    a base structure supporting the yoke,
    said yoke having two spaced projections extending in the same lateral direction therefrom with upper surfaces to engage the underside of said portion of the hose, said yoke having a third projection extending in the same lateral direction therefrom with an under surface to engage the upperside of said portion of the hose, said third projection being between the first two projections with said lower surface of the third projection spaced above a line defined by the upper surfaces of said two projections, said lower surface of the third projection being spaced from said line by less than the outside diameter of the hose to cause said portion of the hose to bow downward and thereby incline the end of the hose upward.

said base structure having hinged legs to make the device collapsible for compact storage.

5. A combination as set forth in claim 4 in which said yoke is shaped to engage a nail to permit the collapsed device to be hung on a wall.

6. In a device of the character described to hold an end portion of a garden hose in position for watering a selected ground area, the combination of:

a yoke to engage the end portion of the hose;

a base structure; and means pivotally mounting the yoke on the base structure for tilt adjustment of the yoke about a transverse axis, said yoke having two spaced projections extending in the same lateral direction therefrom with upper surfaces to engage the underside of said portion of the hose, said yoke having a third projection extending in the same lateral direction therefrom with an under surface to engage the upperside of said portion of the hose, said third projection being between the first two projections with said lower surface of the third projection spaced above a line defined by the under surfaces of said two projections, said lower surface of the third projection being spaced from said line by less than the outside diameter of the hose to cause said portion of the hose to bow downward and thereby incline the end of the hose upward.

7. A combination as set forth in claim 6 in which said mounting means includes:

a transverse pivot member fixed relative to one of said yoke and said base structure; and means fixed relative to the other of said yoke and base structure in pressure contact with the pivot member to frictionally oppose change in tilt adjustment of the yoke.

8. A combination as set forth in claim 7 in which:

said pivot member is fixed relative to the yoke;

in which a support member on the support structure rotatably supports the pivot member; and in which means on the support structure frictionally engages the pivot member to press the pivot member downward against the support means to create the frictional opposition to change in tilt adjustment of the yoke.

9. A combination as set forth in claim 8 in which said frictionally engaging means includes stressed spring means to press the pivot member downward against the support member.

10. In a device of the character described to hold an end portion of a garden hose in position for watering a selected ground area, the combination of:

a yoke to engage the end portion of the hose; and a base structure;

means mounting the yoke on the base structure for tilting adjustment of the yoke about a transverse axis and for rotary adjustment of the yoke about an upright axis, said yoke having two spaced projections extending in the same lateral direction with upper surfaces to engage the underside of said portion of the hose, said yoke having a third projection extending in the same lateral direction with an under surface to engage the upperside of said portion of the hose, said third projection being between the first two projections with said lower surface of the third projection spaced above a line defined by the under surfaces of said two projections, said lower surface of the third projection being spaced from said line by less than the outside diameter of the hose to cause said portion of the hose to bow downward.

11. In a device of the character described to hold an end portion of a garden hose in position for watering a selected ground area, the combination of:

a base member;

three legs attached to the base member to support the base member above ground level;

a yoke having two spaced projections extending in the same lateral direction with upper surfaces to engage the underside of said portion of the hose, said yoke having a third projection extending in the same lateral direction with an under surface to engage the upperside of said portion of the hose, said third projection being between the first two projections with said lower surface of the third projection spaced above a line defined by the under surfaces of said two projections, said lower surface of the third projection being spaced from said line by less than the outside diameter of the hose to cause said portion of the hose to bow downward and thereby incline the end of the hose upward;

an elongated transverse pivot member fixedly connected to the yoke;

a pair of spaced upward projections on the base member forming spaced seats rotatably supporting the pivot member;

stirrup means embracing the pivot member at two spaced points; and means connecting the stirrup means to the base member to cause the stirrup means to exert downward pressure on the pivot member to frictionally resist rotation of the pivot member relative to said spaced seats.

12. A combination as set forth in claim 11 in which said connecting means extends downward through the base member and carries spring means to exert downward force on the stirrup means.

13. In a device of the character described to hold an end portion of a garden hose in position for watering a selected ground area, the combination of:

a base member in the form of a downwardly flanged sheet metal stamping;

three legs in the form of flanged sheet metal stampings hingedly mounted on the base member for support thereof;

a transverse elongated pivot member;

a support member in the form of a sheet metal stamping on the base member having two upwardly extending spaced wings rotatably supporting the pivot member;

a stirrup member on the support member having two upwardly extending wings with apertures therein embracing the pivot member;

fastening means extending downward through the stirrup member, support member and base member, said fastening means pivotally interconnecting the three members and acting on the stirrup member to press the pivot member downward against the support member; and an upright yoke in the form of a sheet metal stamping rigidly mounted on the pivot member to tilt about the axis thereof, said yoke having three projections in the form of tongues extending in one lateral direction, two of said tongues being spaced apart with upper surfaces to engage the underside of said portion of the hose, the third tongue having an under surface to engage the upper side of said portion of the hose, said third tongue being between the two tongues with said lower surface of the third tongue spaced above a line defined by the under surfaces of the two tongues, said under surface of the third tongue being spaced from said line by less than the outside diameter of the hose to cause said portion of the hose to bow downward.

14. A combination as set forth in claim 13 in which said fastening means carries annular spring means backed against the underside of the base member to cause the stirrup member to press the pivot member downward against the support member.

References Cited

UNITED STATES PATENTS

| 388,788 | 8/1888 | Prescott | 248—84 |
| 471,156 | 3/1892 | Tinsley | 248—82 |
| 2,424,708 | 7/1947 | Resch | 248—183 |
| 2,425,893 | 8/1947 | Molitor | 248—87 |

FOREIGN PATENTS 15,663  7/1929  Australia.

CHANCELLOR E. HARRIS, *Primary Examiner.*

K. J. WINGERT, *Assistant Examiner.*